(12) United States Patent
Albert et al.

(10) Patent No.: US 7,800,496 B2
(45) Date of Patent: Sep. 21, 2010

(54) METHODS, DEVICES AND SECURITY SYSTEMS UTILIZING WIRELESS NETWORKS AND DETECTION DEVICES

(75) Inventors: David E. Albert, Oklahoma City, OK (US); William E. Saltzstein, Woodinville, WA (US)

(73) Assignee: Innovalarm Corporation, Oklahoma City, OK (US)

( * ) Notice: Subject to any disclaimer, the term of this patent is extended or adjusted under 35 U.S.C. 154(b) by 1038 days.

(21) Appl. No.: 11/482,611

(22) Filed: Jul. 7, 2006

(65) Prior Publication Data

US 2008/0007404 A1 Jan. 10, 2008

(51) Int. Cl.
*G08B 13/00* (2006.01)

(52) U.S. Cl. ............ 340/541; 340/506; 340/539.1; 340/539.21

(58) Field of Classification Search ............ 340/541, 340/506, 539.1, 539.21, 539.22, 565, 567, 340/3.1, 825.36, 825.49
See application file for complete search history.

(56) References Cited

U.S. PATENT DOCUMENTS

| | | | |
|---|---|---|---|
| 5,198,799 A | 3/1993 | Pascale | |
| 6,104,288 A | 8/2000 | Hopkins | |
| 6,310,549 B1 | 10/2001 | Loftin et al. | |
| 6,542,078 B2 | 4/2003 | Script et al. | |
| 6,759,983 B2 | 7/2004 | Eden | |
| 6,762,686 B1 | 7/2004 | Tabe | |
| 6,806,811 B1 | 10/2004 | Readler | |
| 6,831,557 B1 | 12/2004 | Hess | |
| 6,900,772 B2 | 5/2005 | Pulver | |
| 6,917,336 B2 | 7/2005 | Rowser et al. | |
| 6,934,266 B2 | 8/2005 | Dulin et al. | |
| 6,946,959 B2 | 9/2005 | Wang | |
| 7,423,530 B2 * | 9/2008 | Babich et al. ............ 340/545.1 |
| 2005/0113031 A1 | 5/2005 | Turner et al. | |

OTHER PUBLICATIONS

"Wi-Fi HotSpotList.com The Definitive WiFi Hotspot", http://www.wi-fihotspotlist.com/faq.html, viewed Oct. 6, 2005.
"UltraSensor . . . Motion Dectection that Makes Security Sense", http://www.ultravisionsecurity.com/Security.html, viewed Jun. 23, 2006.
"TADLYS Last Yard Solutions", http://www.tadlys.com/pages/solutions.asp, viewed Jun. 23, 2006.
"Herecast An open infrastructure for WiFi location-bases services", http://www.herecast.com, viewed Jun. 23, 2006.
"Skyhook Wireless", http://www.skyhookwireless.com/, viewed Jun. 23, 2006.
"The Effect of the Human Body on Antenna System Design", "Connect802", http://www.connect802.com/human_body_rf.htm, viewed Oct. 26, 2005.
"Location using WiFi-WiFi Positioning", "Daconi", http://www.daconi.net/wifi-pos/wifi-positioning.php, viewed Jun. 23, 2006.

(Continued)

*Primary Examiner*—Daryl Pope
(74) *Attorney, Agent, or Firm*—Dunlap Codding, P.C.

(57) ABSTRACT

Security systems, methods, and devices for monitoring a region for movement utilize a wireless network detector having a directional antenna and a transmitter for transmitting the detected wireless network signal strength to a computer. Analysis of changes in the signal strength measurements determines the presence of movement requiring a response.

42 Claims, 4 Drawing Sheets

OTHER PUBLICATIONS

"WiMAX", http://en.wikipedia.org/wiki/Wimax, viewed Nov. 4, 2005.

Josef Hallberg, Marcus Nilsson, KaRE Synnes, "Positioning with Bluetooth," Published at the 10th International Conference on Telecommunications ICT'2003.

Wireless Communication Technologies, "WiFi," availabe at http://library.thinkquest.org/04oct/01721/wireless/wifimain.htm, viewed Jun. 2006.

* cited by examiner

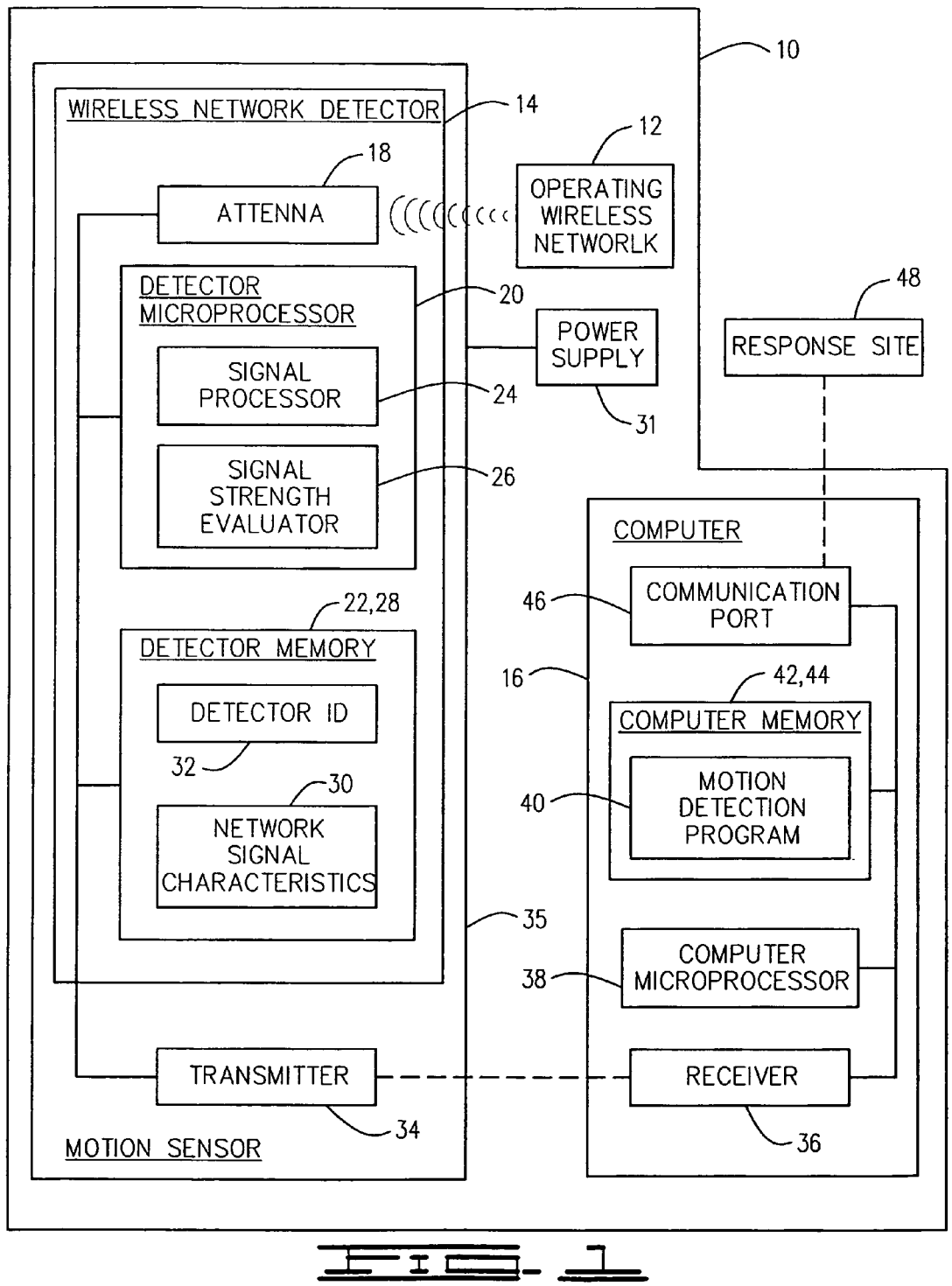

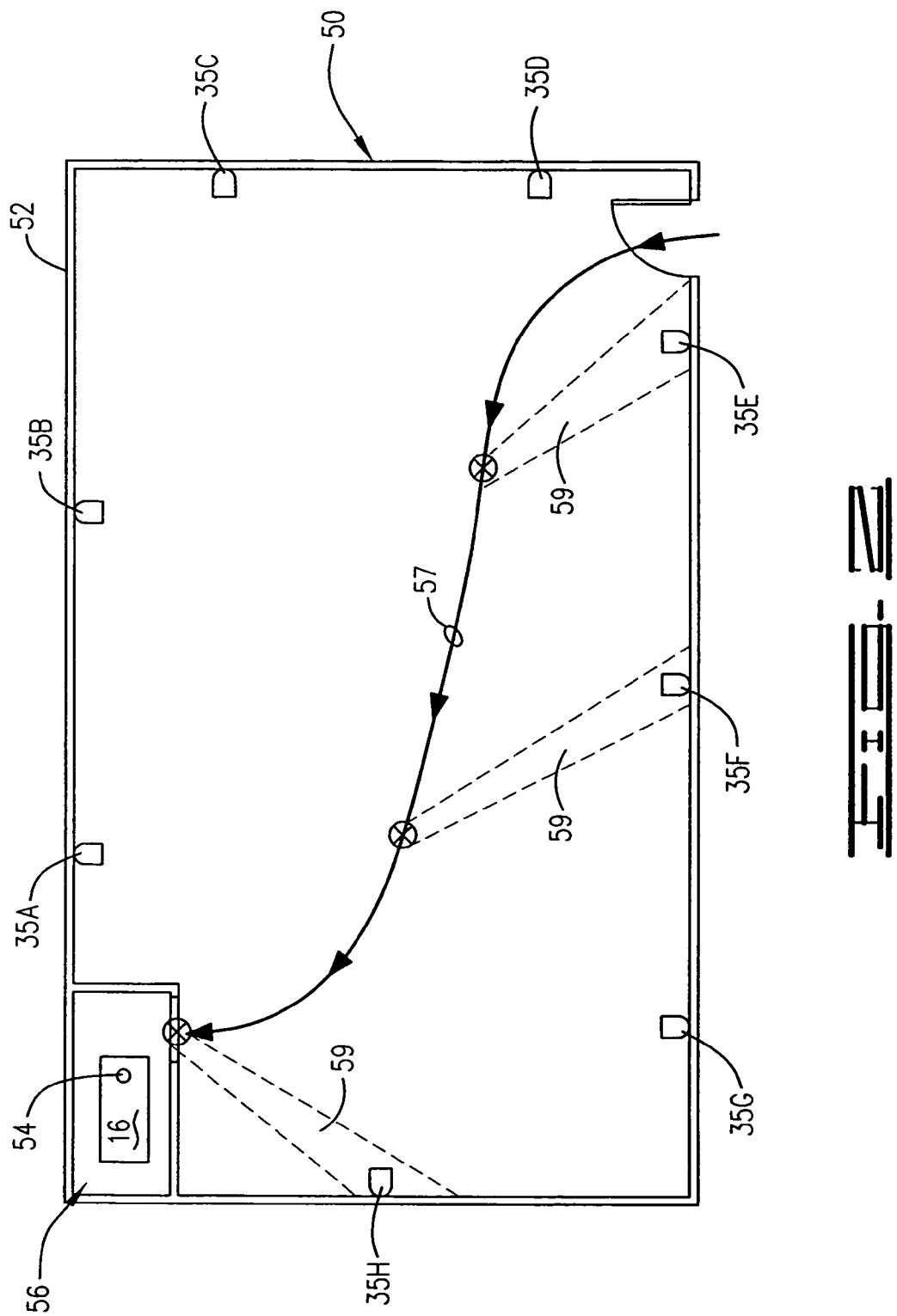

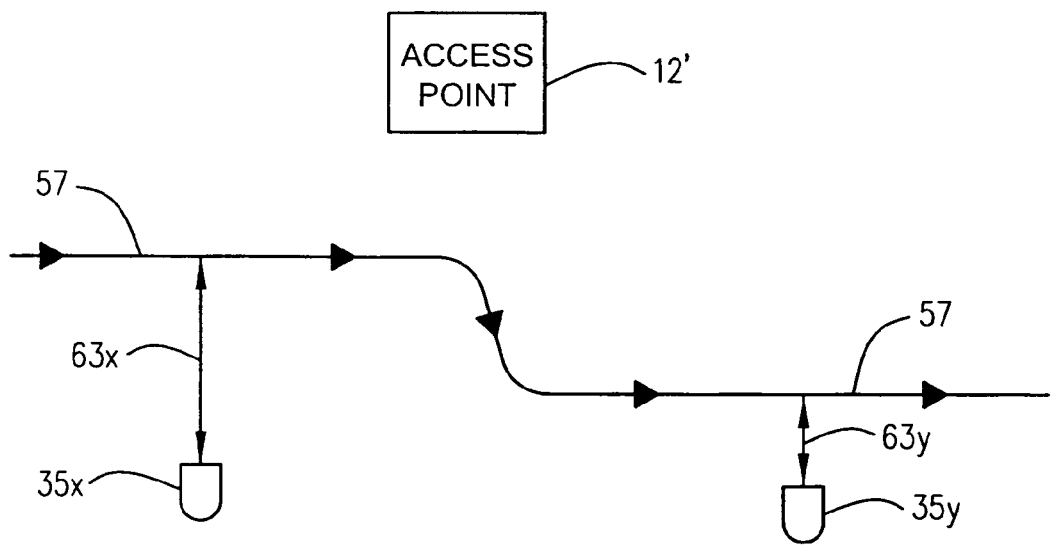
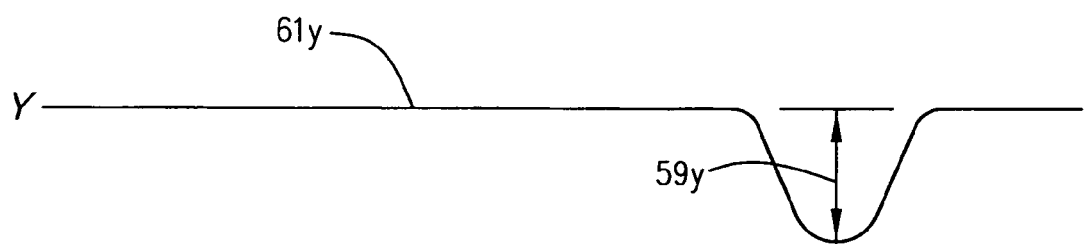
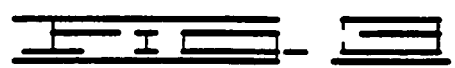

METHODS, DEVICES AND SECURITY SYSTEMS UTILIZING WIRELESS NETWORKS AND DETECTION DEVICES

BACKGROUND OF THE INVENTION

This invention relates generally to real time methods, systems and devices useful for detecting motion indicative of unwanted intruders such as burglars in a home or business. The invention offers a low cost alternative to conventional security systems.

Businesses and private residences often use elaborate security systems to detect the presence of intruders. For example, video surveillance systems are available but are generally expensive and usually do not operate in real time. Therefore, while helpful in identifying an intruder after the fact, video surveillance does not generally detect the intrusion while it is occurring. Perimeter security systems are available which make use of a series of door and window sensors. Also, heat sensor and photo sensor type motion detectors are used to detect an unwanted intrusion. Although these sensors can offer real time response to an intrusion, they can also be difficult and costly to install and are prone to false alarms.

A basic photo-sensor type motion detector emits a light beam which triggers an alarm whenever anyone interrupts the beam. For example, an infrared transmitter/receiver pair can establish a beam across an area to be protected, and any cessation of the beam reception, such as that caused by a person walking between the transmitter and receiver, triggers an alarm. Other detection units are available that emit a beam which is reflected on the other side of a room and the reflected beam is then detected by the same unit. Each of these systems requires precise equipment alignment which can be difficult to achieve as well as to maintain. Any slight jarring or movement of the equipment causes a loss of beam reception and causes a false alarm. Additionally, the location of such devices is usually obvious to the intruder who can then avoid activating them.

What is needed is a motion detection method and system that is simple, inexpensive, easy to install, and not readily detectable by an intruder.

SUMMARY OF THE INVENTION

By the present invention, security systems, methods, and devices for monitoring a region for movement are provided which meet the above described needs and overcome the deficiencies of the prior art. A method of the present invention for monitoring a region for movement basically comprises the following steps. A wireless network detection device is used to monitor the signal strength of a pre-existing wireless network. Changes in the monitored network signal strength are evaluated to determine if the changes represent movement requiring a response, and if required, responsive signals are generated and sent.

In a preferred embodiment, the method for monitoring a region for movement comprises the following steps. The signal strength of a pre-existing wireless network is detected and measured using one or more wireless network detection devices wherein each device includes an antenna, a microprocessor, and a transmitter. The detection devices transmit the detected network signal strength measurements to a computer that has an installed specialized motion detection program and a communication port. The motion detection program is operated to determine when changes in the transmitted network signal strength measurements likely represent movement requiring a response and, if required, response signals are then generated and sent out the communication port.

Additionally the current invention provides a motion sensor comprising a wireless network detection device including a receiving antenna for detecting signals, and a transmitter. The detection device also includes a microprocessor with a signal processing function for evaluating a radio frequency signal received by the antenna based upon wireless network characteristics and means for determining the strength of the detected wireless network signal. The transmitter transmits the determined wireless network signal strength to a computer which may be pre-existing.

In other embodiments, the motion sensor further includes memory and motion detection software stored within the memory. The software includes first instructions for determining when changes in the wireless network signal strength represent motion requiring an alarm response, and second instructions for communicating responsive signals through the transmitter when an alarm response is determined. The motion sensor may additionally include an acoustic alarm and responsive signals may include means for activating the acoustic alarm when an alarm response is determined.

Security systems of the present invention comprise an operating wireless network, a wireless network detection device, a transmitter in electrical connection with the wireless network detection device, and motion detection software installed on a computer. The wireless network detection device includes a directional antenna for receiving signals from a predetermined direction, and a signal processor as described above. The detection device provides output that corresponds to the strength of the detected wireless network signal. The transmitter is used to transmit the signal processor output to the computer having installed motion detection software. The software includes first and second instructions as described above. In a preferred embodiment, three or more network detection devices with directional antennae are located to form a grid of received signals and the motion detection software includes means to evaluate the path and position of an intruder in real time based on received signals and the grid geometry.

Other features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a block diagram of a security system of the present invention.

FIG. 2 is an example of a security grid provided by the present invention.

FIG. 3 is an example signal reception.

DESCRIPTION OF THE PREFERRED EMBODIMENTS

Figure 4:
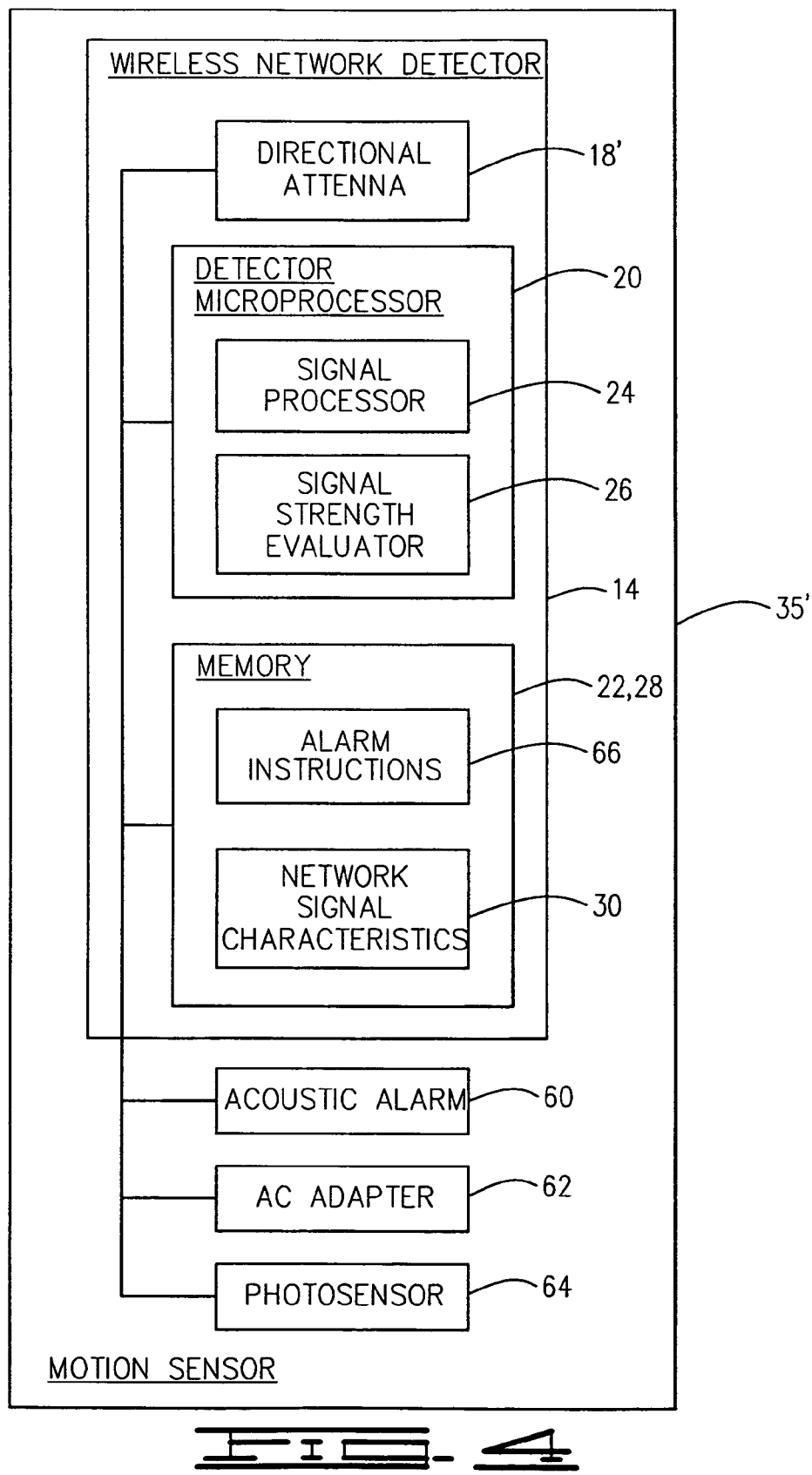
FIG. 4 is an example of a motion sensor alarm of the present invention.

A security system of the present invention utilizes a wireless network, a wireless network detection device for detecting the network signal and signal strength, and a transmitter for transmitting the detected signal strength to a computer. Motion detection software is installed on the computer for determining when changes in the detected wireless network signal strength likely represent motion of a body blocking transmission of the network radio frequency and therefore requiring an alarm response. The computer also has software instructing the computer to communicate responsive signals when an alarm response is required.

Referring to FIG. 1, a security system 10 of this invention includes a wireless network 12, a wireless network detection device 14 and a computer 16. The wireless network detection device 14 detects a signal and the signal strength from the wireless network 12 utilizing an antenna 18 that is communicatively coupled to a detector microprocessor 20 and detector memory 22. The detector microprocessor 20 includes a signal processor 24 and a signal strength evaluator 26. Detector memory 22 provides a storage substrate 28 for network signal characteristics 30 used to identify signals from the wireless network 12. Preferably, security system 10 includes more than one wireless network detection device 14, each powered by a power supply 31, and each detection device including a detector identification 32 stored in memory 22. The detection device uses a transmitter 34 to transmit the detected signal strength, and preferably also the detector identification, to a receiver 36 in computer 16. The wireless network detection device 14 in operable combination with transmitter 34 provides a motion sensor 35.

The computer 16 uses a computer microprocessor 38 and a motion detection means or program 40 to determine when changes in the detected signal strength represent intrusive motion requiring a response. The computer microprocessor 38 utilizes a computer memory 42 which also provides a storage substrate 44 for the motion detection program 40. Preferably the computer includes a communication port 46 providing the ability to communicate the motion detection via wired or wireless means to a response site 48.

Wireless computer networks have become very common as it is important for individuals to be able to send and retrieve electronic information and messages and to access professional and personal networks regardless of the location of the individual. Hotels, restaurants, and other establishments catering to the public, frequently offer wireless Internet access to their customers. Businesses and even home networks are also increasingly using wireless networking to avoid the cost and inconvenience of wiring individual rooms and offices.

The wireless network 12 is optionally a wireless local area network commonly referred to a wireless LAN. The wireless LAN is similar to a wired network, but it uses radio waves rather than copper wire or optic fiber. Wireless LAN technology is well known to those skilled in the art and is commonly used to replace or enhance wired LANs in businesses, airports, hotels, and homes.

Nonlimiting examples of suitable wireless networks include WiFi, Bluetooth and WiMAX. The term "WiFi" stands for "Wireless Fidelity" and is used to define any of the wireless technologies in the IEEE 802.11 specification including 802.11a, 802.11b, and 802.11g. The numeric nomenclature comes from the Institute of Electrical and Electronics Engineers (IEEE) that creates the standards and numbers these standards. Bluetooth technology falls under the IEEE protocol 802.15.1. "WiMAX" stands for "Wireless Interoperability for Microwave Access" and is a certification mark for products meeting the IEEE 802.16 specifications. WiMAX is a wireless metropolitan area network that can connect WiFi "hotspots" with each other and to other parts of the Internet. WiMAX is particularly useful for outdoor applications while WiFi and Bluetooth are particularly useful for applications inside buildings.

A Mesh Network can also be utilized to provide wireless broadband coverage to an area. In this case, wireless mesh nodes or access points acts as repeaters or routers to transmit data from nearby nodes to peer nodes in the network. These systems are considered reliable and resilient since the routing algorithm used at each node attempts to determine which next node to send data to for the fastest route to its destination. If one node leaves the network, due to hardware failure for example, then its neighbor nodes find another route for the information. Mesh networking equipment is available commercially from, for example, Daconi Ltd. located in Coventry, UK.

These and other wireless network technologies have defined radio frequency (RF) characteristics and can be detected and identified by message envelope characteristics such as message length, repetition rate and response timing. Thus, wireless network detectors such as the WiFi Finder available from Kensington have been developed based on these defined characteristics. The working of such devices is more fully described in U.S. Patent Application Publication No. US 2005/0113031 A1 (published on May 26, 2005) assigned to Kensington Technology Group and which is incorporated herein by reference.

The effect of the human body on RF wave propagation depends generally on the frequency of the signal. Above about 4 MHz, the human body absorbs RF energy and may be considered to be essentially opaque to RF. At frequencies higher than about 1 GHz, the dielectric properties of the body due to the body's water content begin to also cause scattering or reflection of the RF signal. IEEE 802.11b and 802.11 g transmit at 2.4 GHz; IEEE 802.11a operates at 5 GHz; IEEE 802.16 operates in the 10 to 66 GHz range and IEEE 802.16a transmits in the 2 to 11 GHz range. Thus, a human body placed between a wireless network signal and antenna 18 should effectively block or reduce the signal strength detected by the wireless network detection device 14 by creating a signal "shadow." Such signal blocking is referred to herein and in the appending claims as a "shadow" and the resulting breach in signal reception may be used to indicate intrusive motion or motion requiring an alarm response.

Antenna technology is well known to those skilled in the art. Preferably, the detector antenna 18 is a directional antenna. In this way, only signals from a predetermined direction are received. For example, a building monitored by the security system of this invention preferably uses one or more wireless network detection devices inside the building monitoring the signal strength of a wireless network also within the building. Although numerous wireless network signals may be detectable at each detector location, changes in the strength of network signals directed from outside the building do not necessarily represent an intruder. Instead, the external network signal may be momentarily blocked from a detector antenna by, for example, a truck moving along the street. Thus, using a directional antenna directed toward signals from within the area monitored reduces the number of false positive alarms. Nonlimiting examples of units with suitable directional antennae include the Wi-Fi Locator (model HWL1), an 802.11b/g Wireless Network Locator from Hawking Technologies, and the Wi-Fi Finder Plus from Kensington. Another suitable approach is to use groups of detection devices to triangulate the intrusion location, and eliminate the above false positive alarms without the need for a directional detector antenna.

The signal processing function 24 of network detector microprocessor 20 utilizes network signal characteristics 30 stored in memory 28 and is well known to those skilled in the art and available commercially. For example, traditional RF spectrum analyzers and network signal detectors are incorporated in most personal computers and include known network characteristics stored in the computer memory and a signal processing function based on these characteristics. Also, portable devices capable of detecting wireless network connection points are available commercially and assist the user to more easily identify areas having wireless internet service. Nonlimiting examples of microprocessors 20 having suitable signal processing functions 24 are those incorporated in the WiFi Finder and WiFi Finder Plus, available from Kensington. These products are small battery-operated units that can detect 802.11b and 802.11g signals up to 200 feet away and filter out other wireless signals, such as from cordless phones and microwaves, so that there is little risk of detecting the wrong signal. Also available is the Linksys WUSBF54G which combines a WiFi finder and a network adaptor.

The electronics required for the signal strength evaluator 26 of the signal detection device are also well known to those skilled in the art. Preferably, the wireless network detection device 14 incorporates a signal strength evaluator 26 that provides an analog output corresponding linearly to the logarithmic strength of the signal. Nonlimiting examples of suitable signal strength evaluators 26 include those incorporated in the Kensington WiFi Finder described above. Other nonlimiting examples of suitable signal strength evaluators 26 include those incorporated in a computer, Personal Digital Assistant (PDA), or Smartphone on a wireless network. The measurement is commonly called "Received Signal Strength Indication" or RSSI.

Preferably, the wireless network detection device 14 includes a code or detector identification (ID) 32 distinguishing the particular detection device from other detection devices. More preferably, the detector ID 32 is set by the user. In this way, multiple wireless network detection devices can be located at specific locations within the monitored space and by transmitting detected network signal strength along with detector ID, the computer 16 can better determine the likelihood of an intrusion.

Suitable signal transmitters 34 include both wired and wireless types; however a wireless RF signal transmitter is preferably used. Signal transmitter technology is well known to those skilled in the art. Conventional wireless transmitters convert a binary digital signal to infrared or a modulated RF signal and transmit the converted signal through the atmosphere. RF signals have the advantage that they can pass through walls. Nonlimiting examples of suitable transmitters include those available commercially from Radio Shack®, Glolab™, and others. Preferably the signal transmitters 34 also transmit a signal indicating their RF output power. In this way, the RF signal strength actually received by receiver 36 can also be compared to the RF output power signal.

The network signal detection device requires a power supply 31 which can be battery or AC current. The portable network detectors commercially available operate on battery power and are limited in their hours of operation, operating only when activated by the user. Preferably, the network signal detection device 14 of this invention includes a plug for a standard electrical outlet and can therefore operate continuously or intermittently.

The term "computer" as used in this description and in the claims encompasses any digital apparatus having a microprocessor 38 and memory 42, and capable of receiving messages or signals. Non-limiting examples from existing technology include: mainframe, workstation, server, palmtop, notebook, laptop, desktop, smartphone and any other digitally intelligent apparatus in the home or workplace that can detect signals from a transmitter and accept user programs. Preferably, the computer can access the Internet or other global communication network.

Referring to FIG. 1, preferable features of the computer include one or more of the following: microprocessor 38 per se or other digitally implemented controller or central processing unit (cpu), memory 42, receiver 36, and one or more output devices such as a communication port 46. The microprocessor 38 comprises any suitable digital control apparatus capable of controlling or functioning within the operations described in this specification.

The memory 42 provides the storage substrate 44 for program storage space and operational working space, and it can be implemented by one or more memory devices compatible with the selected microprocessor. The storage space is used for storing system software, application programs, utility programs, and a motion detection program 40 of the present invention.

The motion detection program 40 uses input from the wireless network detector transmitter(s) 34 to determine in real time when an intrusive motion has occurred. Nonlimiting variables evaluated are the detected signal strength, time, detector identification (ID) and corresponding direction of the signal monitored by the directional antenna of the detection device. The probability of a false alarm is reduced by time averaging and the use of multiple detection devices. Preferably, the wireless computer network and/or the network detectors also transmit their RF output power. This output power, combined with the received signal strength, can be used to characterize a "path loss" between the computer and detectors, as well as between detectors. This "path loss" can be used to infer either distance between devices or intervening materials. The "path loss" is preferably part of an automatic characterization of the environment to account for things like walls and furniture.

It should also be noted that, while describing a system using multiple detection devices or access points and a single transmitter, a system using multiple (individually identified) transmitters and a detection device or single access point produces equivalent results. Also, motion detection subroutines can be incorporated in the software to existing Wireless Access Points such as, for example, the LinkSys WAP54G.

Numerous variations in program logic can be utilized and are known by those skilled in the art. For example, radio-frequency identification systems (FRID) use passive tag or active tags (powered by a battery) to provide product tracking, inventory control, and location detection. Using triangulation and conventional programming, the location of a single product item can be identified in detail. One new tracking system proposed utilizes a WiFi-active RFID tag chip such as the G2C501 chip available from G2 Microsystems which works directly with the existing wireless local area network. The present invention utilizes the same programming logic and techniques; however, WiFi "shadows" are triangulated rather the WiFi signals. Programming necessary to modify existing tracking software to enable tracking of network signal shadows is well known to those skilled in the art.

Once the motion detection program 40 concludes that an intrusive motion has occurred, a second set of instructional signals within the computer memory is used to generate and send an alarm message through communication port 46 to a response site 48 including the Internet or its World Wide Web, a pager system, a telephone system, or another e-mail system. For example, the computer can further comprise an RJ-11 jack that can be connected to a standard phone system in order to send an alert(s) to the police department when sensing an intrusion. Alternatively, the computer can send a wired or wireless burglar alarm notification to a network operating center monitoring station, which will immediately forward it to the appropriate security or police department. A variety of communication ports and their setup and functioning are well known to those skilled in the art.

In order to further illustrate the systems, devices and methods of the present invention, the following hypothetical examples are given.

EXAMPLE 1

The following example illustrates the versatility of the invention and specifically the advantages of arranging multiple network signal detection devices to form an array or grid pattern of monitored space within the area being security monitored for intrusions.

In this example, the owners of a small coffee shop in a busy downtown area desire a security system because several nearby businesses have recently been broken into late at night. The coffee shop ("café") provides free wireless Internet service to their customers and the owners determine the most economic security system would use the existing wireless computer network along with wireless network detection devices to detect the presence of an intruder and the intruder's real time location and movement within the café. Since no one is in the café after closing, any momentary blocking of the network signal from a signal detection device can be considered motion of an intruder or burglar.

Wireless network detection devices with directional antennae are adapted to include signal transmitters and ac adapter power plugs insertable into standard wall electrical outlets so that the resulting motion sensors 35 can run continuously. Referring now to FIG. 2, café 50 is monitored using motion sensors 35A-35H which are positioned on the café walls 52 at electrical outlets spaced at locations A through H. The antenna on each detection device is aligned to receive signals from a wireless router 54 in the café computer room 56. By using directional antennae, the café owners have substantially eliminated interference from WiFi sources other than the café router 54. Each detection device thus monitors a narrow conical zone between the detection device and the router and together the detection devices form a type of grid.

When an intruder enters the café side door 55 after closing hours, he walks along the path 57 shown in FIG. 2. His body creates a "shadow" by absorbing and scattering the network signals from the router and this shadow is sensed as a signal interruption each time he crosses a monitored zone. Each detection device wirelessly relays the detected signal strength, along with its individual detector identification, to computer 16 in an adjacent computer room 56. Each interruption, or signal strength decrease or deletion, is relayed with little or no signal loss through the wall separating the main café 50 from the adjacent computer room 56.

The computer is programmed to note the initial signal block, in this case from motion sensors 35C. Since this sensor shows a signal interruption, and the other sensors do not, it is unlikely that this initial event is a false alarm. Nevertheless, the computer is programmed to require a second event before sending a response signal. When the intruder next momentarily reduces the signal strength to sensor 35F and finally to 35H, the computer 16 sends a text message to the cell phones of both coffee shop owners and also alerts the local police department. The computer 16 continues to track the intruder's progress through the café. On arrival at the coffee shop, the owners and the police use a notebook computer linked to the coffee shop wireless computer network to locate the intruder. They see he is still blocking the 35H monitoring zone and has made no other signal interruptions for several minutes. Assuming the intruder is now trying to break through the locked door 58 to the computer room 56, the police enter the coffee shop and arrest the intruder.

EXAMPLE 2

The following example illustrates qualitatively how the signal detected by a detection device changes upon interception by a human body. Referring to FIG. 3, a wireless network access point 12' receives signals from detection devices 35$x$ and 35$y$ representing the signal strength X and Y detected by each over time. As an intruder walks along path 57, the intruder's body causes a dip in the signal strength 61$x$ detected by device 35$x$ as the intruder intercepts the network signals received by device 35$x$. Similarly, his body causes a dip in the signal strength 61$y$ detected by device 35$y$ as he intercepts the network signals received by device 35$y$. The amplitude of the signal strength "dip" is proportional to both the mass of the body intercepting the signal, and the proximity of the body to the detector. As shown in FIG. 3, the long distance 63$x$ between path 57 and the detection device 35$x$, at the time of interception for device 35$x$, results in a relatively small decrease in signal strength as represented by amplitude 59$x$. However, the shorter distance 63$y$ between path 57 and the detection device 35$y$, at the time of interception for device 35$y$, results in a much greater decrease in signal strength as represented by the larger amplitude 59$y$.

EXAMPLE 3

The following example illustrates another embodiment of the present invention. In this case, a home owner makes use of her existing wireless computer network using the methods and devices of this invention. Referring now to FIG. 4, wireless network detection devices with directional antennae are adapted to include acoustic alarms 60 and ac adapter power plugs 62 insertable into standard wall electrical outlets so that the detection devices can run continuously when activated. The detection devices include an inexpensive photo sensor 64 so they activate automatically at night just like a night light. The detector memory 28 contains network signal characteristics 30 as previously described, and additionally contains alarm instructions 66 for the microprocessor 20 to activate the acoustic alarm 60 if the signal detection is interrupted.

The homeowner places such a detection device or motion sensor 35' on the inside wall beside the front room window with the antenna 18' directed at the router for her computer network and intersecting a path likely to be crossed by a person entering through the window. Another motion sensor 35' is positioned on an inside wall adjacent the front door with the antenna also directed toward the router and parallel to the floor across the door opening. Since the network signals pass through the door, the act of opening the door will not set the alarm off, but a human body passing through the doorway will.

After dark, a burglar does attempt to enter the house through the front room window. Since the detector is located on the inside wall, rather than in the window frame it is not noticed and avoided by the burglar. As the burglar's body intersects the narrow conical space monitored by the wireless network detection device, the signal is interrupted and the acoustic alarm is activated, causing the burglar to flee.

Thus, the present invention is well adapted to attain the objects and advantages mentioned as well as those that are inherent therein. While numerous changes may be made by those skilled in the art, such changes are encompassed within the spirit of this invention as defined by the appended claims.

What is claimed is:

1. A method of monitoring a region for movement comprising the steps of:
   (a) monitoring the signal strength of a wireless network using a wireless network detection device to provide signal strength measurements;
   (b) evaluating the signal strength measurements for changes; and
   (c) determining if changes in the signal strength measurements represent movement requiring a response, and in response thereto, generating and sending response signals.

2. The method of claim 1 wherein the wireless network is a wireless computer network.

3. The method of claim 1 wherein the wireless network detection device comprises a radio frequency detector.

4. The method of claim 3 wherein the wireless network detection device further comprises a microprocessor for evaluating detected signals based on wireless network characteristics.

5. The method of claim 1 wherein the wireless network detection device is powered by an alternating current source.

6. The method of claim 1 wherein the wireless network detection device is powered by direct current supplied by an ac converter.

7. The method of claim 1 wherein the wireless network detection device comprises a directional antenna.

8. The method of claim 1 wherein step (a) includes transmitting the signal strength measurements from the wireless network detection device to a computer, and wherein steps (b) and (c) are performed using the computer.

9. The method of claim 8 further comprising transmitting a power signal from the pre-existing wireless network indicating the output power of the wireless network.

10. The method of claim 9 wherein step (b) further includes comparing the signal strength measurement to the transmitted power signal.

11. The method of claim 8 wherein step (a) further includes transmitting the network detection device output power.

12. The method of claim 11 wherein step (b) further includes comparing the transmitted detection device signal strength to the transmitted detection device output power.

13. The method of claim 8 wherein step (a) uses two or more wireless network detection devices.

14. The method of claim 13 further comprising determining the position of a person from the signal strength measurements transmitted to a computer utilizing triangulation estimating software.

15. A method of monitoring a region for movement comprising the steps of:
   (a) detecting the signal strength of a pre-existing wireless network using two or more identifiable wireless network detection devices, each detection device comprising an antenna, a microprocessor, and a transmitter, and transmitting detected network signal strength measurements and transmitter identification signals to a computer having an installed specialized motion detection program and a communication port; and
   (b) by operating the motion detection program, determining if changes in the transmitted network signal strength measurements represent movement of a person requiring a response, and in response thereto, determining the real time position of the person and generating and sending response signals out the communication port of the computer.

16. The method of claim 15 wherein the pre-existing wireless network is a wireless computer network.

17. The method of claim 15 wherein the detection device antenna is a directional antenna.

18. The method of claim 15 wherein generating and sending response signals includes generating and sending alarm notification signals to local emergency personnel.

19. The method of claim 15 wherein generating and sending response signals includes generating and sending alarm notification signals to a monitoring service.

20. The method of claim 19 further comprising communicating from the monitoring service to a telecommunication number, e-mail address, or instant message address.

21. The method of claim 19 wherein generating and sending response signals includes generating and sending alarm notification signals to an Internet site having an Internet address encoded within the motion detection program.

22. The method of claim 21, further comprising communicating from the Internet site to a telecommunication number or e-mail address designated for the computer.

23. The method of claim 15 wherein step (b) further comprises:
   generating a local alarm signal in response thereto.

24. The method of claim 23 wherein the local alarm signal is a wired signal.

25. The method of claim 23 wherein the local alarm signal is a wireless signal.

26. The method of claim 25 wherein the wireless signal is selected from the group consisting of an audio alarm, a strobe light, and a radio frequency signal.

27. A motion sensor comprising:
   a wireless network detection device including, a receiving antenna for detecting signals, and a microprocessor including a first signal processing function for evaluating a radio frequency signal received by the antenna based upon wireless network characteristics, and second signal processing function for determining the strength of the detected wireless network signal; and
   a transmitter in electrical connection with the wireless network detection device for transmission of the determined wireless network signal strength to a computer.

28. The motion sensor of claim 27 wherein the receiving antenna is a directional receiving antenna for detecting signals from a predetermined direction.

29. The motion sensor of claim 27 further comprising a plug electrically connected to the detection device for receiving alternating current from a standard electrical outlet.

30. A motion sensor comprising:
   a wireless network detection device including memory, a directional receiving antenna for detecting signals from a predetermined direction, and a microprocessor including a signal processing function for evaluating a radio frequency signal received by the antenna based upon wireless network characteristics and determining the strength of the detected wireless network signal;
   a transmitter in electrical connection with the wireless network detection unit; and
   motion detection software stored within the memory, including:
      first instructions for determining when changes in the wireless network signal strength represent motion requiring an alarm response; and
      second instructions for communicating responsive signals through the transmitter when an alarm response is determined.

31. A motion sensor comprising:
   a wireless network detection device including memory, a directional receiving antenna for detecting signals from a predetermined direction, and a microprocessor including a signal processing function for evaluating a radio frequency signal received by the antenna based upon wireless network characteristics and a signal strength function for determining the strength of the detected wireless network signal;

motion detection software stored within the memory, including instructions for determining when changes in the wireless network signal strength represent an intruder; and an acoustic alarm adapted to actuate when an intruder is determined.

32. A security system comprising:

an operating wireless network;

a wireless network detection device, wherein the network detection device comprises an antenna for receiving signals from a predetermined direction, and a signal processor for evaluating a radio frequency signal received by the antenna based upon wireless network characteristics and for providing output that corresponds to the strength of the detected wireless network signal;

a transmitter in electrical connection with the wireless network detection device, for transmitting the signal processor output to a computer; and motion detection software installed on the computer, including:

first instructions for determining when changes in the detected wireless network signal strength represent motion requiring an alarm response; and second instructions for communicating responsive signals from the computer when an alarm response is determined.

33. The security system of claim 32 wherein the antenna is a directional antenna.

34. The security system of claim 32 comprising two or more wireless network detection devices.

35. The security system of claim 32 comprising three or more network detection devices located to form a grid of monitored space.

36. The security system of claim 35 wherein the motion detection software includes instructions for evaluating the path and real time position of an intruder.

37. The method of claim 1, where the monitored signals of the wireless network are within the radio frequency range and above about 4 MHz.

38. The method of claim 1, wherein the wireless network uses IEEE or other wireless protocols and technologies.

39. The method of claim 1, wherein step (c) includes determining if changes in the signal strength measurements represent a shadow(s) in the wireless field, the shadow(s) indicating movement requiring a response.

40. The system of claim 32, wherein the detected wireless network signal is within the radio frequency range and above about 4 MHz.

41. The system of claim 32, wherein the wireless network uses IEEE or other wireless protocols and technologies.

42. The system of claim 32, wherein the motion detection software installed on the computer include first instructions for determining when changes in the detected wireless network signal strength represent a shadow(s) in the wireless field, the shadow(s) indicating motion requiring an alarm response.

* * * * *